United States Patent [19]

Sarin et al.

[11] Patent Number: 4,892,792
[45] Date of Patent: Jan. 9, 1990

[54] A1N COATED SILICON NITRIDE BASED CUTTING TOOLS

[75] Inventors: Vinod K. Sarin, Lexington; Charles D'Angelo, Southboro, both of Mass.

[73] Assignee: GTE Laboratories Incorporated, Waltham, Mass.

[21] Appl. No.: 233,876

[22] Filed: Aug. 12, 1988

Related U.S. Application Data

[63] Continuation of Ser. No. 103,333, Oct. 1, 1987, abandoned.

[51] Int. Cl.$^4$ .................. C23C 11/08; B32B 13/04
[52] U.S. Cl. .................................. 428/698; 428/699
[58] Field of Search .................. 428/469, 698, 699

[56] References Cited

U.S. PATENT DOCUMENTS

| | | | |
|---|---|---|---|
| Re. 29,420 | 9/1977 | Lindstrom et al. | 428/336 |
| Re. 31,526 | 2/1984 | Smith et al. | 75/235 |
| Re. 32,093 | 3/1986 | Hale | 428/336 |
| Re. 32,111 | 4/1986 | Lambert et al. | 428/212 |
| 3,306,768 | 2/1967 | Peterson | 117/106 |
| 3,511,703 | 5/1970 | Peterson | 117/213 |
| 3,836,392 | 9/1974 | Lux et al. | 117/169 R |
| 3,914,473 | 10/1975 | Hale | 427/255 |
| 3,955,038 | 5/1976 | Lindstrom et al. | 428/457 |
| 3,967,035 | 6/1976 | Hale | 428/336 |
| 3,977,061 | 8/1976 | Lindstrom et al. | 29/95 R |
| 4,018,631 | 4/1977 | Hale | 148/31.5 |
| 4,019,873 | 4/1977 | Reiter | 428/217 |
| 4,035,541 | 7/1977 | Smith et al. | 428/217 |
| 4,101,703 | 7/1978 | Schintlmeister | 428/216 |
| 4,112,148 | 9/1978 | Fonzi | 427/248 C |
| 4,150,195 | 4/1979 | Tohioka et al. | 428/548 |
| 4,162,338 | 7/1979 | Schintlmeister | 427/249 |
| 4,237,184 | 12/1980 | Gonseth et al. | 428/336 |
| 4,269,899 | 5/1981 | Fuyama et al. | 428/457 |
| 4,282,289 | 8/1981 | Kullander et al. | 428/457 |
| 4,406,667 | 9/1983 | Sarin et al. | 51/295 |
| 4,406,668 | 9/1983 | Sarin et al. | 51/295 |
| 4,409,003 | 10/1983 | Sarin et al. | 51/295 |
| 4,409,004 | 10/1983 | Sarin et al. | 51/295 |
| 4,416,670 | 11/1983 | Sarin et al. | 51/295 |
| 4,421,525 | 12/1983 | Sarin et al. | 51/295 |
| 4,431,431 | 2/1984 | Sarin et al. | 51/295 |
| 4,440,547 | 4/1984 | Sarin et al. | 51/295 |
| 4,441,894 | 4/1984 | Sarin et al. | 51/295 |
| 4,449,989 | 5/1984 | Sarin et al. | 51/295 |
| 4,463,033 | 7/1984 | Kikuchi et al. | 427/255.3 |
| 4,463,062 | 7/1984 | Hale | 428/698 |
| 4,497,874 | 2/1985 | Hale | 428/551 |
| 4,576,836 | 3/1986 | Colmet et al. | 427/255 |
| 4,609,562 | 9/1986 | Isenberg et al. | 427/8 |
| 4,619,865 | 10/1986 | Keem et al. | 428/333 |
| 4,619,866 | 10/1986 | Smith et al. | 428/336 |
| 4,629,661 | 12/1986 | Hillert et al. | 428/698 |
| 4,643,951 | 2/1987 | Keem et al. | 428/469 |
| 4,670,024 | 6/1987 | Bhat et al. | 51/295 |
| 4,695,517 | 9/1987 | Okuno et al. | 428/698 |
| 4,818,626 | 4/1989 | Werdecker et al. | 428/698 X |

FOREIGN PATENT DOCUMENTS 129775 7/1984 Japan.

OTHER PUBLICATIONS

Schienle and Smyth, Report #ORNL/Sub/-84-47992/1, published Mar. 1987, USDOE Oak Ridge National Laboratory.

*Primary Examiner*—Nancy A. B. Swisher
*Attorney, Agent, or Firm*—Frances P. Craig

[57] ABSTRACT

Cutting tools, cutting tool inserts, and wear parts having improved mechanical and chemical wear resistance under demanding conditions of machining speed, temperature, or wear conditions comprising a monolithic or composite silicon nitride-based substrate having a hard adherent coating layer of a refractory aluminum nitride, and optionally an outer adherent coating layer of a refractory material. The preferred outer layer refractory materials are the carbides, nitrides, and carbonitrides of Ti, Zr, Hf, Nb, V, Ta, Cr, Mo, and W, and mixtures and solid solutions thereof, alumina and zirconia.

8 Claims, 2 Drawing Sheets

AlN COATED SILICON NITRIDE BASED CUTTING TOOLS

This is a continuation of co-pending application Ser. No. 103,333 filed on Oct. 1, 1987 now abandoned.

CROSS-REFERENCE TO RELATED APPLICATIONS

This application is related owned U.S. patent application Ser. No. (103,333) filed concurrently herewith by V. K. Sarin.

BACKGROUND OF THE INVENTION

This invention relates to cutting tools, cutting tool inserts and wear parts. More particularly, it is concerned with monolithic or composite silicon nitride ceramic articles having an adherent refractory aluminum nitride coating deposited thereon.

Cemented carbide materials are well known for their unique combination of properties of hardness, strength, and wear resistance, and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increasing commercial utility for certain cutting tool, machining, and wear part applications.

Economic pressures for higher productivity, for example in machining applications, are placing increasing demands upon the performance of such coated materials. To achieve high productivity in machining, a tool must be able to cut at high speeds. At cutting speeds exceeding 1500 surface feet per minute (sfpm), the high temperature strength and chemical inertness of a cutting tool material become increasingly important. The usefulness of cemented carbide cutting tool materials (the predominant material used in cutting tools) has been extended to applications requiring cutting speeds of about 1500 sfpm by coating such tools with aluminum oxide. For cutting speeds in excess of 1500 sfpm, cemented carbide tools encounter problems associated with coating adherence, loss of strength, and tool nose deformation, which affect dimensional tolerance in the workpiece and contribute to shorter tool life.

Conventional ceramic cutting tools overcome some of these disadvantages but have limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel. Improvements have been made by coating silicon nitride-based ceramic substrates with alumina or with carbides and/or nitrides and/or carbonitrides of titanium, zirconium, hafnium, vanadium, niobium, tantalum, chromium, molybdenum, and tungsten, as disclosed and claimed in U.S. Pat. Nos. 4,406,667, 4,406,668, 4,406,669, 4,406,670, 4,409,003, 4,409,004, 4,416,670, 4,412,525, 4,412,528, 4,424,066, 4,426,209, 4,431,431, 4,440,547, 4,441,894, and 4,449,989, all commonly owned with the present invention. However, it would be desirable to improve even further the adherence and wear resistance of these substrates.

The present invention provides improved coated cutting tools and cutting tool inserts for the machining of metals under demanding conditions of machining speed, temperature, or workpiece hardness. The coated articles according to the present invention exhibit improved coating adherence and wear resistance, useful not only in cutting and machining applications, but also in wear part applications such as for metal drawing dies.

SUMMARY OF THE INVENTION

A wear resistant coated article according to the present invention comprises a densified monolithic or composite or silicon nitride-based substrate body having an adherent refractory aluminum nitride coating layer deposited thereon.

In a narrower aspect, the article includes at least one outer adherent coating layer of a refractory material having a different chemical composition from that of the aluminum nitride coating layer.

In a still narrower aspect, the material of the outer adherent refractory coating layer comprises the carbides, nitrides, or carbonitrides of titanium, zirconium, hafnium, vanadium, niobium, tantalum, chromium, or molybdenum, or combinations thereof, alumina or zirconia.

DETAILED DESCRIPTION OF THE PREFERRED EMBODIMENTS

Figure 1:
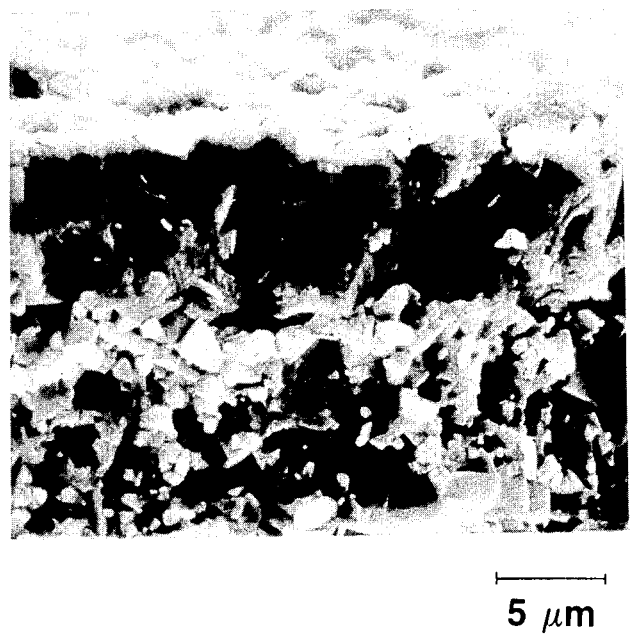
FIG. 1 is a photomicrograph of a coated article according to the invention.

An illustrative coated cutting tool insert according to the present invention comprises a composite silicon nitride substrate including finely divided particles, fibers or whiskers of a hard refractory material uniformly distributed in a densified silicon nitride matrix. By the term hard refractory material is meant the carbides and/or nitrides and/or carbonitrides of titanium, zirconium, hafnium, vanadium, niobium, tantalum, chromium, molybdenum, and tungsten, including combinations and solid solutions thereof. Such substrates are described in detail in U.S. Pat. No. 4,388,085, and in U.S. patent application Ser. No. 892,642 filed Aug. 4, 1986, both commonly owned with the present application. The particles, fibers, or whiskers of the hard refractory material are uniformly distributed in a matrix of a first phase of silicon nitride grains, and a refractory second phase of silicon nitride and an effective amount of a densification aid such as yttria, zirconia, hafnia, alumina, magnesia, the lanthanide rare earth oxides, and the like, and mixtures thereof.

The average particle size of the hard refractory particulate preferably ranges between about 0.5 micron to about 20 microns. The preferred aspect ratio for the fibers and whiskers is greater than 5; the preferred diameter is 1-5 microns. The carbide and/or nitride and/or carbonitride refractory material contained in the substrate body is about 0-60 volume percent, preferably about 15-50 volume percent, most preferably about 20-40 volume percent of the substrate body. Also suitable as substrates are the silicon nitride materials described in above referenced U.S. Pat. Nos. 4,406,668, 4,409,003, 4,431,431, 4,440,547, and 4,449,989.

In accordance with the principles of the present invention, an adherent coating layer of aluminum nitride is deposited on the substrate body. Optionally, at least one hard adherent outer coating layer comprising a refractory material may be deposited over the aluminum nitride layer. Typical refractory materials for the outer coating layer include nitrides, carbides, and carbonitrides of titanium, zirconium, hafnium, vanadium, niobium, tantalum, chromium, molybdenum, and tungsten, as well as alumina, zirconia, and alumina- and zirconia-based composite materials. Preferred outer coatings in accordance with this invention are titanium nitride, titanium carbide, titanium carbonitride, hafnium nitride, hafnium carbide, hafnium carbonitride, and alumina. Each of the aluminum nitride and outer coating layers is preferably of a thickness ranging between about 0.1 microns to about 20 microns, preferably between about 1.0 and about 10 microns.

Exemplary methods of making coated cutting tools, tool inserts, and wear parts in accordance with this invention are given below. The methods are to be viewed as illustrative and are not to be viewed as limiting the scope of the invention as defined by the appended claims. Illustrative methods of preparing the substrate bodies of the invention are described in above referenced U.S. Pat. Nos. 4,431,431 and 4,441,894, and application Ser. No. 892,642. The relevant portions of these patents and application are incorporated herein by reference.

COATING METHODS

The composite substrate body described above is coated with an adherent aluminum nitride coating layer, which optionally is then coated with a refractory material layer, both layers being deposited by chemical vapor deposition (CVD) techniques or physical vapor deposition (PVD) techniques to form the adherent coating. For example, the preferred coatings of aluminum nitride; titanium or hafnium carbide, carbonitride, or nitride; and alumina are applied by CVD. Other metal carbides, carbonitrides, or nitrides are applied by CVD techniques where such techniques are applicable, or by PVD techniques such as direct evaporation, sputtering, etc.

Useful characteristics of the CVD method are the purity of the deposited layer and the tendency for some interaction between the layer being deposited and the substrate or intermediate layer during early stages of the deposition process, which leads to further improved layer adherency.

Deposition of an AlN layer

An aluminum nitride layer is deposited on the silicon nitride-based substrate of this invention by passing a gaseous mixture of an aluminum halide, a gaseous nitrogen source such as nitrogen or ammonia, and hydrogen over the substrate layer at a temperature of about 800° C.–1500° C., preferably at temperatures above about 1000° C. A typical reaction is described by the following equation. (Hydrogen is added to insure that the reaction takes place in a reducing environment.):

$$2\ AlCl_3 + N_2 + 3\ H_2 \rightarrow 2\ AlN + 6\ HCl \qquad (1)$$

The mixture is passed over the heated substrate until the desired coating thickness is achieved. Routine experimentation is used to determine the rate of coating thickness growth at a particular gaseous flow rate and temperature. Optionally, the AlN coated substrate may be heat treated at 1100° C.–1500° C., depending on the substrate material, to further improve adherence through diffusion between the coating and the substrate. This is particularly useful following coating at low temperatures. The AlN coated cutting tool may be used without further coating layers, or may be coated with additional refractory materials as described below. FIG. 1 illustrates an AlN coated article according to the invention, in which the substrate is a sintered silicon nitride.

Deposition of an $Al_2O_3$ outer layer

An alumina outer adherent coating layer is applied by CVD techniques. In one CVD technique, more fully described in U.S. Pat. No. 3,914,473, vaporized aluminum chloride or other halide of aluminum is passed over the AlN coated substrate together with water vapor and hydrogen gas. Alternatively, the aluminum oxide is deposited by PVD techniques such as direct evaporation or sputtering. A typical reaction for the CVD technique is described by the following equation, although hydrogen gas is often added to insure that the reaction takes place in a reducing atmosphere:

$$2\ AlCl_3 + 3\ H_2O \rightarrow Al_2O_3 + 6\ HCl \qquad (2)$$

The AlN coated substrate bodies are heated to a temperature of about 800° C.–1500° C. in a furnace equipped for gaseous flow. The aluminum chloride supply is preheated to vaporize the material, and the aluminum chloride vapor is passed through the furnace, together with the other gases. The gas mixture is passed over the heated coated substrates until the desired coating thickness is achieved. Routine experimentation is used to determine the rate of coating thickness growth at a particular gaseous flow rate and temperature.

Another, preferred method of coating the aluminum nitride coated bodies with outer adherent alumina coating layers, is by reacting aluminum chloride with carbon dioxide in the presence of hydrogen gas according to the following equation:

$$2\ AlCl_3 + 3\ CO_2 + 3\ H_2 \rightarrow Al_2O_3 + 3\ CO + 6\ HCl \qquad (3)$$

Carbon monoxide is optionally added to the gas mixture passed over the heated substrate bodies or coated bodies in order to establish the desired equilibrium gas composition.

Deposition of a MC or MN layer

A metal carbide or metal nitride outer layer may be formed on the substrates of cutting tools of this invention by CVD or PVD techniques. In one CVD method, the coating is formed by passing a gaseous mixture of metal chloride, either a gaseous nitrogen source such as nitrogen or ammonia or a gaseous carbon source such as methane, and hydrogen over the substrate at a temperature of between about 800° C. and 1500° C., preferably at temperatures above about 1000° C. The reaction to deposit TiC or TiN may be described by one of the following equations:

$$TiCl_4 + CH_4 \rightarrow TiC + 4\ HCl \qquad (4)$$

$$2 TiCl_4 + N_2 + 3 H_2 \rightarrow TiN + 6 HCl \qquad (5)$$

The mixture is passed over the heated substrate until the desired coating thickness is achieved. An equivalent proportion of $NH_3$ may substitute for the $N_2$ in equation (5). Routine experimentation is used to determine the rate of coating thickness growth at a particular gaseous flow rate and temperature.

Deposition of an M(C,N) layer

The aluminum nitride coated substrate body described above may be coated with an outer refractory metal carbonitride coating by CVD or PVD techniques. For example, the preferred coatings of titanium carbonitride or hafnium carbonitride are applied by CVD. Alternatively, the refractory metal is deposited by chemical or physical vapor deposition techniques after which the metal layer is nitrided and carburized.

For example, titanium carbonitride outer layers are formed on the substrates of cutting tools of this invention in a CVD technique by passing a gaseous mixture of titanium tetrachloride, a gaseous carbon source such as methane, a gaseous nitrogen source such as nitrogen or ammonia, and hydrogen over the substrate at a temperature of between about 800° C. and 1500° C., preferably at temperatures above about 1200° C. Dissociated ammonia may be substituted for a mixture of nitrogen and hydrogen gases. The reaction is described by the following equation, although hydrogen is often added to insure that the reaction takes place in a reducing environment:

$$TiCl_4 + CH_4 + N_2 \rightarrow Ti(C_xN_y) + 4HCl \quad (6)$$

The mixture is passed over the heated substrate until the desired coating thickness is achieved. Routine experimentation is used to determine the rate of coating thickness growth at a particular gaseous flow rate and temperature.

Control of the amounts of methane and nitrogen in the gas mixture permit the formation of layers in which the ratio of x to y in the formula $Ti(C_xN_y)$ are varied. The values of x and y preferably range between about 0.5 to about 0.6 for x and from about 0.4 to about 0.5 for y resulting in a preferred range of x/y ratio of from about 1.0 to about 1.5. The most preferred ratio of x to y is about 1.22, corresponding to values for x and y of about 0.55 and about 0.45, respectively.

The following Examples illustrate the advantages provided by the coated substrates, as cutting tools, cutting tool inserts, and wear parts, in accordance with the present invention, having an adherent coating of aluminum nitride alone or an intermediate coating of aluminum nitride and a refractory outer coating.

EXAMPLE 1

Adherence of AlN, TiC/AlN, and prior art coatings

As shown in Table I below, various coatings were deposited by the methods described above on silicon nitride-based substrates. The substrates were: (A) $Si_3N_4$ containing yttria and alumina as sintering aids, (B) composite $Si_3N_4$ including dispersed TiC particles, and (C) $Si_3N_4$ containing yttria and magnesia as sintering aids. The coatings deposited were: AlN as grown (AlN), AlN heat treated as described above at 1350° C. (AlN(H.T.)), an AlN intermediate layer and a TiC outer layer (TiC/AlN), and as controls a TiC layer alone (TiC), and a titanium nitride intermediate layer and a TiC outer layer (TiC/TiN). Not all coatings were deposited on all substrates. Table I shows the results of scratch tests on the coated substrates to measure coating adherence.

TABLE I

| Coating | Adherence on substrate, kg | | |
|---|---|---|---|
| | (A) | (B) | (C) |
| AlN | 6.5 | — | 9.0 |
| AlN (H.T.) | 14.0 | — | — |
| TiC/AlN | — | — | 8.5 |
| TiC | <1.0 | 3.0 | 1.0 |
| TiC/TiN | 2.0 | 5.5 | 1.5 |

Figure 2:
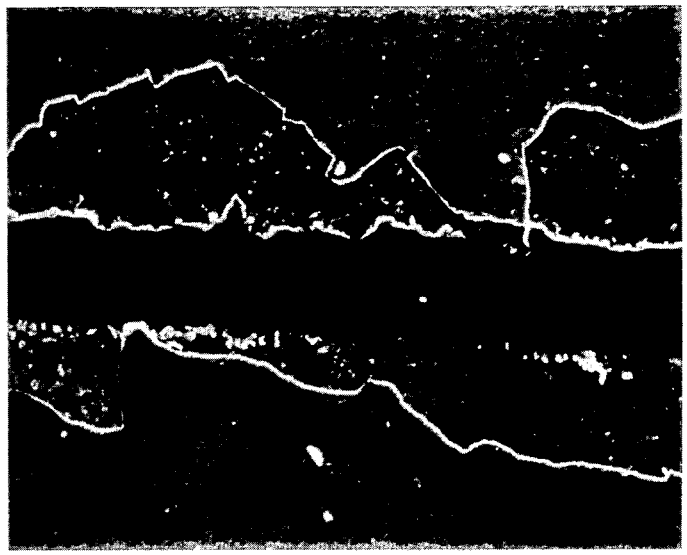
FIGS. 2 and 3 are photomicrographs of coated articles according to the prior art and the invention, respectively, following scratch testing.
Figure 3:
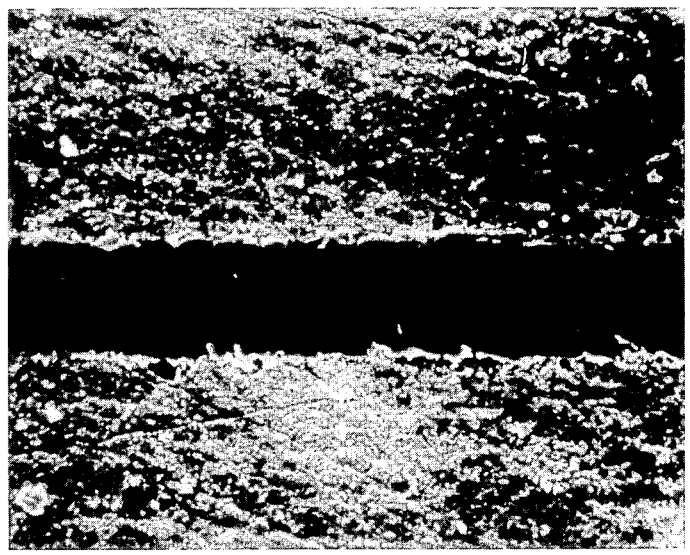

These results illustrate the improved adherence of the AlN coating layer over TiC coatings, including those applied on a substrate having titanium nitride predeposited thereon. Further, improved adherence is shown for TiC deposited over an AlN layer on substrate (C), illustrating the advantage of using AlN as an intermediate adherent layer. The improvement is further illustrated in FIGS. 2 and 3, which are photomicrographs of coated substrates similar to substrate (C), showing the coating delamination caused by the scratch test on two coatings. FIG. 2 illustrates catastrophic failure of a TiC/TiN coating, with extensive flaking off of the coating under a 1.0 kg load. FIG. 3 illustrates removal of a TiC/AlN coating only in the path of the scratch tester at 8.5 kg load.

EXAMPLE 2

Wear resistance of TiC/AlN, TiN/AlN, and prior art coatings

Figure 4:
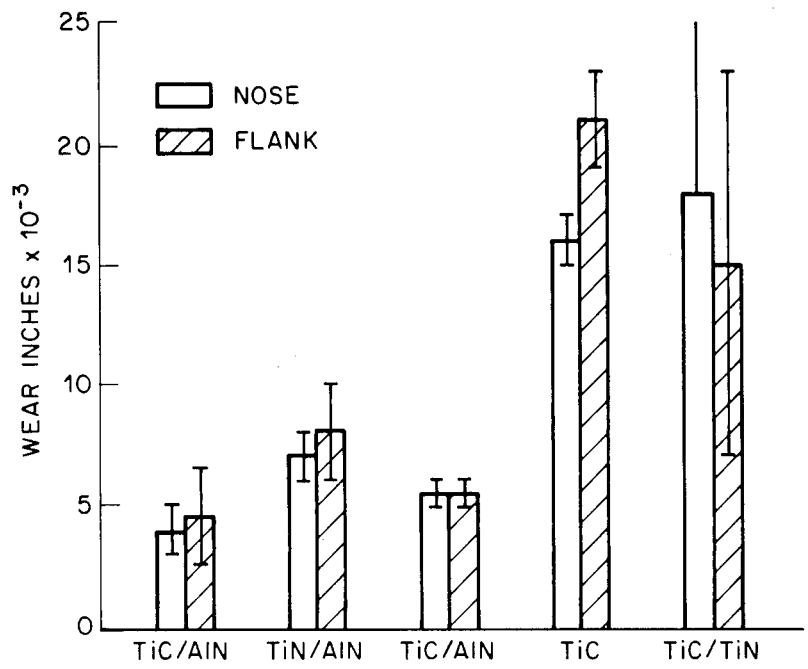
FIG. 4 is a bar graph illustrating the results of comparative machining tests.

Cutting tool inserts of substrate (C) coated with TiC/AlN (two series), titanium nitride over an AlN intermediate coat (TiN/AlN), TiC, and TiC/TiN were tested for wear resistance by dry machining 4340 steel at 600 rpm at 0.050 in depth of cut, 0.015 in/rev feed rate for a 10 in axial distance. Average nose and flank wear for the inserts is illustrated in FIG. 4. Nose and flank wear for the TiC/AlN coated inserts were about one-third or less of that of the TiC and TiC/TiN coated inserts, while that for the TiN/AlN inserts were also low.

A similar degree of improvement may be expected for other AlN coated silicon nitride-based substrates.

Depending on the machining application and the workpiece material, the use of an AlN layer alone or the combination of various coatings as described above can be tailored to enhance overall cutting tool performance. This is achieved through the aluminum nitride layer, which offers improved adherence of the coating to the substrate, and combinations of the aluminum nitride layer and the outer layers achieving the improved adherence and improved structure and properties of the coatings such as hardness, fracture toughness, impact resistance, chemical inertness, 15 etc.

While there have been shown and described what are at present believed to be the preferred embodiments of the invention, it will be obvious to one skilled in the art that various modifications may be made therein without departing from the scope of the invention as defined by the appended claims.

What is claimed is:

1. A wear resistant coated article comprising a densified monolithic or composite silicon nitride-based substrate body having an adherent refractory coating layer deposited thereon, the coating layer consisting essentially of aluminum nitride.

2. A wear resistant coated article according to claim 1 further comprising at least one outer adherent coating layer of a refractory material having a different chemical composition from that of the aluminum nitride coating layer, deposited on the aluminum nitride coating layer.

3. A wear resistant coated article according to claim 2 wherein the outer adherent refractory coating layer comprises titanium carbide, zirconium carbide, hafnium carbide, vanadium carbide, niobium carbide, tantalum carbide, chromium carbide, molybdenum carbide, or tungsten carbide.

4. A wear resistant coated article according to claim 2 wherein the outer adherent refractory coating layer comprises titanium nitride, zirconium nitride, hafnium nitride, vanadium nitride, niobium nitride, tantalum nitride, chromium nitride, molybdenum nitride, or tungsten nitride.

5. A wear resistant coated article according to claim 2 wherein the outer adherent refractory coating layer comprises titanium carbonitride, zirconium carbonitride, hafnium carbonitride, vanadium carbonitride, niobium carbonitride, tantalum carbonitride, chromium carbonitride, molybdenum carbonitride, or tungsten carbonitride.

6. A wear resistant coated article according to claim 2 wherein the outer adherent refractory coating layer comprises alumina or zirconia.

7. A wear resistant coated article according to claim 1 wherein the adherent aluminum nitride coating layer is of a thickness between about 0.1 microns and about 10 microns.

8. A wear resistant coated article according to claim 2 wherein the outer adherent coating layer is of a thickness between about 1.0 and about 10 microns.

* * * * *